Nov. 17, 1925.

H. KASAL

REPAIR TIP FOR STEEL PLOWPOINTS

Original Filed Jan. 5, 1922

1,561,648

INVENTOR.
Henry Kasal,
BY
Erwin Wheeler & Woolard
ATTORNEYS

Patented Nov. 17, 1925.

1,561,648

UNITED STATES PATENT OFFICE.

HENRY KASAL, OF KEWAUNEE, WISCONSIN.

REPAIR TIP FOR STEEL PLOWPOINTS.

Application filed January 5, 1922, Serial No. 527,142. Renewed October 1, 1925.

*To all whom it may concern:*

Be it known that I, HENRY KASAL, a citizen of the United States, residing at Kewaunee, county of Kewaunee, and State of Wisconsin, have invented new and useful Improvements in Repair Tips for Steel Plowpoints, of which the following is a specification.

This invention relates to repair tips for plow points, and is particularly directed to repair tips for steel plows.

It is an object of this invention to provide for plows having worn cutting edges a repair tip which may be secured or welded to one side of the plow only and so shaped that, when in position for the welding operation, it will maintain its position during such welding operation, the shape of the repair tip being such that it will eliminate extensive initial preparation or an elaborate form of plow.

Further objects of this invention are to provide a repair tip which will accurately restore the original contour of plow points; which will co-operate with a worn plow point without necessitating elaborate machining or grinding; which will not slip out of place during the welding operation; and which does not render the plow unstable or difficult of control.

Further objects are to provide a repair tip for plow points which may be readily attached to the worn plow by unskilled workmen and which may be cheaply manufactured.

An embodiment of the invention is shown in the accompanying drawing, in which:—

Figure 4:
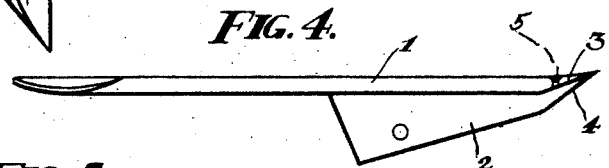
Figure 4 is a plan view of the worn plow without the tip.
Figure 5:
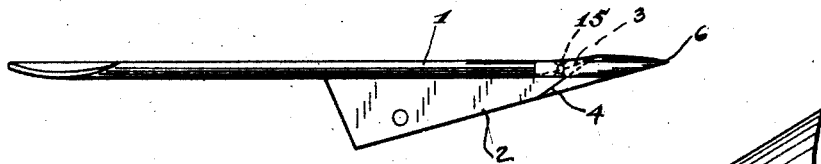
Figure 5 is a view similar to Figure 4 showing the tip in position thereon prior to the welding operation.
Figure 7:
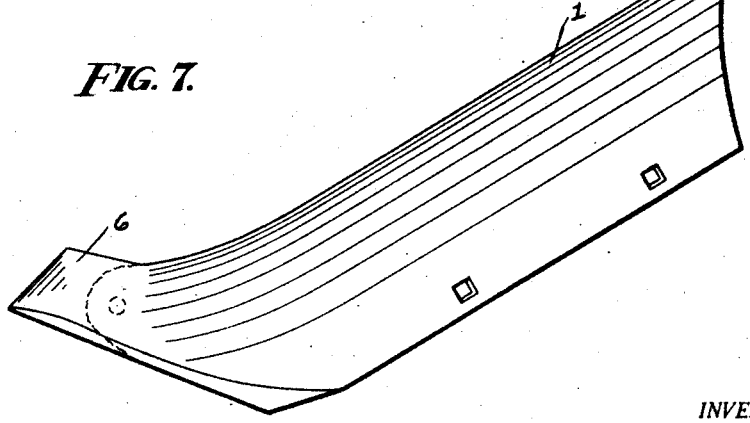
Figure 7 is a face view corresponding to Figure 6 showing the plow point with the tip welded thereon.

The repair tip is preferably formed of forged steel and is adapted to be welded to forged steel plow points. The plowshares comprise a body portion, or curved upper portion, 1 and a landside portion 2, as may be seen from Figures 4 and 5. The wear occurs principally at the forward portion of these plowshares, and the plow points soon become so badly worn as to render the entire plowshare useless. When a worn plowshare is received, the plow point is ground so as to taper the portion 1, as indicated at 3, and to taper the landside portion 2, as indicated at 4. A countersunk hole 5 is drilled through the portion 1 as indicated at 4.

Figure 1:
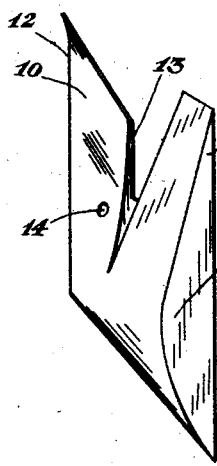
Figure 1 is a perspective view of the repair tip.
Figure 2:
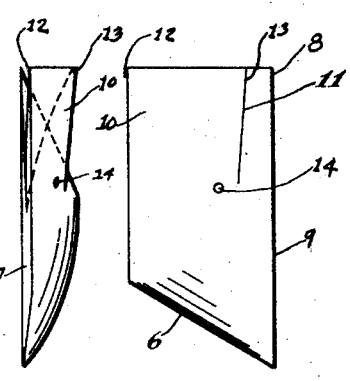
Figures 2 and 3 are edge and face views, respectively, of such tip.
Figures 3, 6:
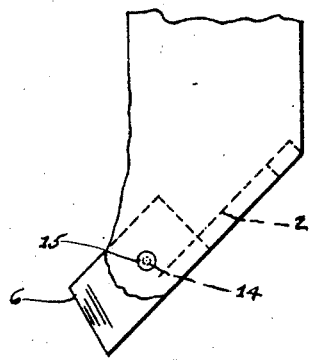
Figure 6 is a fragmentary view of the structure shown in Figure 5.

The repair tip comprises a leading edge 6 which is tapered or bevelled and is upwardly slanting. The tip has a relatively flat surface 7 extending from the lowest point of the leading edge 6 to the rearmost portion of the tip, and of the width of the arm or landside portion 8. The body portion, or approximately central portion, 9 is thickened as may be seen from Figures 1 and 2, and is rounded so as to merge into the rounded tapered portion and the relatively gradually tapered rear portions. These rear portions comprise the arm 8 as previously mentioned and the arm 10, such rear portion being divided along the line 11 (see Figure 3) so as to provide these two arms. The arm or landside portion 8, as previously mentioned, has one flat face forming a continuation of the flat surface of the leading portion or forward portion of the repair tip. The other arm 10 is tapered and is twisted or deflected, as is clearly shown in Figures 1 and 2, so as to allow the edge 12 to approximately remain in the plane of the face 7 while permitting the edge 13 to be removed outwardly from such plane. A countersunk hole 14 is drilled through the plow tip and is adapted to align with the hole 5.

These plow tips are adapted to be placed at the forward portion of the plow point, with the portion 8 in contact with the slanting portion 4 of the landside portion of the plow (see Figure 4), and with the portion 10 contacting with the upper portion or curved portion 1. When thus positioned, a rivet or other securing means, such as screws or bolts, is passed through the aligned holes 14 and 5 to thereby secure the tip position upon the plow point prior to the welding operation. The assembled portions now occupy the relative positions indicated in Figures 5 and 6.

The plow point and the repair tip are now welded together, such welding operation being greatly facilitated by the accurate and secure position of the tip by means of the securing means, namely, the rivet 15. The welding operation may be performed without danger of the slipping of the point out of position. This securing of the tip prior to the welding operation insures an accurate repair and allows the welding operation to be performed with greater speed, as it is not necessary to carefully hold or watch the parts during welding.

It is to be noted that the tapered arm 8 accurately conforms to the landside portion 2, and that the tapered, twisted arm 10 similarly accurately conforms to the upper portion 1 of the plowshare. These portions therefore do not produce bulges or unevenness in the contour of the repaired plow, but restore the original contour, thereby insuring a stable and easily controlled repaired plow.

It is to be further noted that these repair tips do not necessitate accurate machining or grinding of the relative plow point, that is to say, they do not require a notched or cutout portion into which they fit, as has heretofore been the practice. In addition to these features, these repair tips may be very cheaply and readily manufactured, and may be positioned upon and welded to the plow points by unskilled workmen.

I claim:

1. A repair tip for a plow having a worn point and a laterally projecting flange comprising a landside portion and a curved upper portion having an aperture the landside and upper portions having their landside faces beveled to merge into a common plane, said repair tip comprising a cutting edge, a landside portion adapted to register with the landside portion of the plow, and a curved upper portion adapted to contact throughout its face with the landside face of the curved upper portion of the plow, said curved upper portion of the tip being provided with an aperture adapted to register with the aperture in the plow, whereby said tip may be first riveted in position upon the plow and then welded thereto wholly upon one side thereof to form an integral unit with such plow.

2. The combination with a plow having a worn cutting edge, a landside portion and a curved upper portion extending from the cutting edge and the landside portion, said upper portion being provided with an aperture; of a repair tip adapted to be secured to the plow wholly upon the landside thereof, said tip comprising a cutting edge, a landside portion and a curved upper portion provided with an aperture adapted to register with the aperture in the plow and a face adapted to contact with the landside portion of the plow; and a rivet for securing the tip to such plow, said apertures being countersunk to provide an even contour to the plow when the rivet is in position, whereby the pilot and tip may be welded together to constitute an integral unit having smooth surfaces throughout.

HENRY KASAL.